United States Patent [19]

Deiner

[11] 3,964,610
[45] June 22, 1976

[54] LOCKING BICYCLE RACK
[76] Inventor: Arnold F. Deiner, 388 Ave. X, Brooklyn, N.Y. 11223
[22] Filed: Nov. 25, 1974
[21] Appl. No.: 526,947

Related U.S. Application Data
[63] Continuation-in-part of Ser. No. 413,535, Nov. 7, 1973, abandoned.

[52] U.S. Cl. .................................. 211/5; 70/62; 70/235; 211/22; 211/9
[51] Int. Cl.² .......................................... B62H 3/08
[58] Field of Search .................. 211/5, 8, 9, 17, 18, 211/19, 20, 21, 22; 70/62, 233, 234, 235

[56] References Cited
UNITED STATES PATENTS

| | | | |
|---|---|---|---|
| 488,395 | 12/1892 | Justice | 211/20 |
| 573,258 | 12/1896 | Brand | 211/8 |
| 580,032 | 4/1897 | Bierbach | 211/17 |
| 639,991 | 12/1899 | Jewell | 211/19 |
| 2,108,402 | 2/1938 | Dennin | 211/9 X |
| 2,803,349 | 8/1937 | Talbot | 211/22 |
| 3,749,295 | 7/1973 | Palmer | 211/5 X |
| 3,820,662 | 6/1974 | Steers | 211/5 |
| 3,863,767 | 2/1975 | Garwood | 211/8 X |
| 3,865,244 | 2/1975 | Galen et al. | 211/5 |
| 3,865,245 | 2/1975 | Lieb et al. | 211/5 |

FOREIGN PATENTS OR APPLICATIONS

| | | | |
|---|---|---|---|
| 516,858 | 1/1953 | Belgium | 211/20 |
| 296,892 | 9/1928 | Germany | 211/21 |
| 296,892 | 9/1928 | United Kingdom | 211/21 |
| 14,925 | 5/1904 | United Kingdom | 211/18 |
| 14,822 | 9/1895 | United Kingdom | 211/22 |
| 14,740 | 3/1896 | United Kingdom | 211/22 |

Primary Examiner—Roy D. Frazier
Assistant Examiner—Thomas J. Holke
Attorney, Agent, or Firm—Kenyon & Kenyon Reilly Carr & Chapin

[57] ABSTRACT

An improved bicycle locking rack which comprises a pair of parallel sidewalls attached to a solid ground base between which the bicycle is placed. One side of the stall has attached thereto an adjustable locking bar which may be lowered against the frame and locked in place thereby holding the bicycle firmly on the ground between the sidewalls of the stall and effectively preventing removal of the bicycle or any of its expensive components.

12 Claims, 6 Drawing Figures

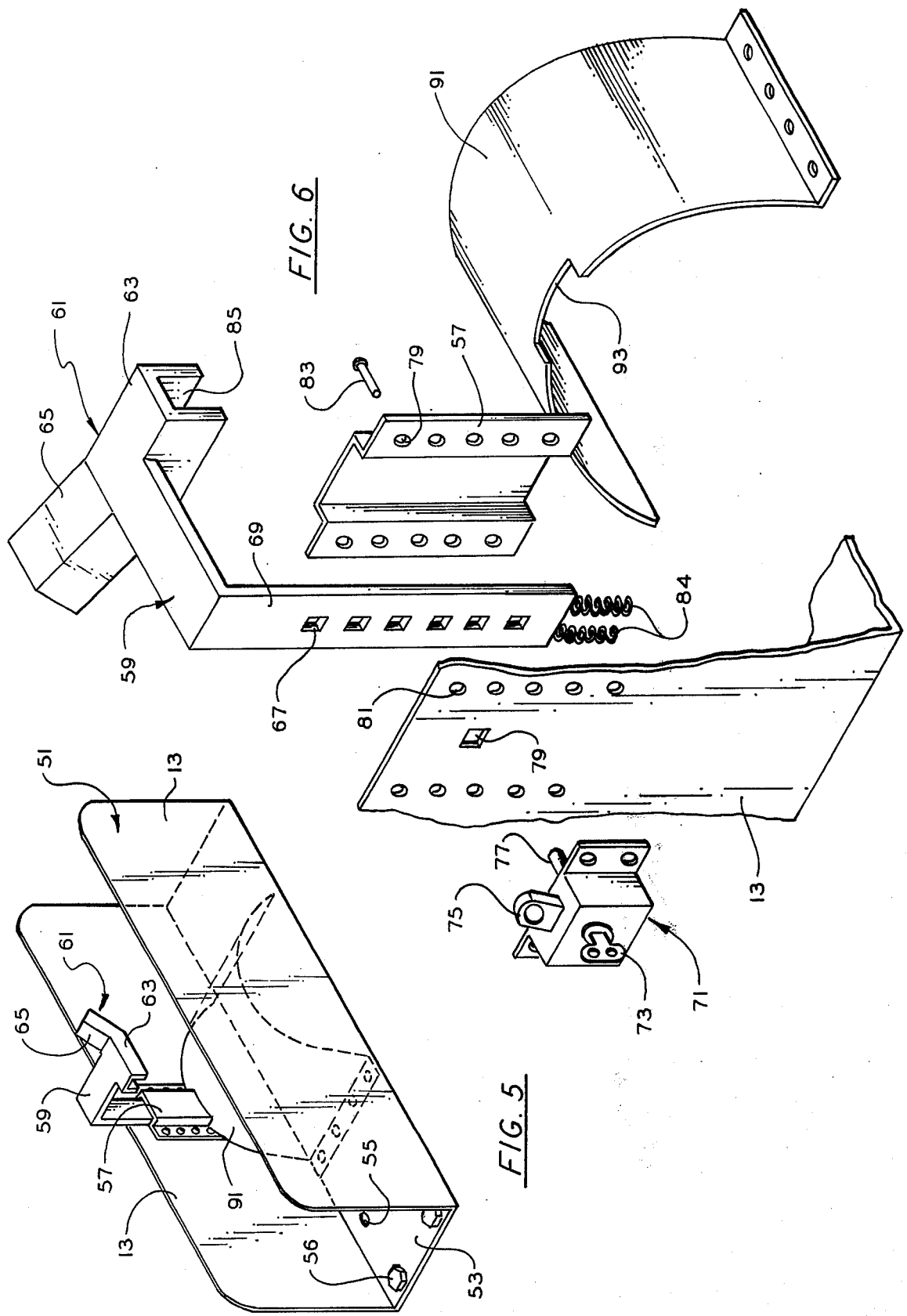

LOCKING BICYCLE RACK

RELATED APPLICATIONS

This application is a continuation-in-part of application Ser. No. 413,535 filed Nov. 7, 1973, and now abandoned.

BACKGROUND OF THE INVENTION

This invention relates to bicycles in general more particularly to a bicycle locking rack.

During the past few years, cycling has become very popular due to an increased awareness of the beneficial health effects of cycling and a desire to decrease pollution which results from motor vehicles. More recently the gasoline shortage and high cost of gasoline has further stimulated the use of bicycles. Along with this interest in cycling has come the development of more and more multispeed bicycles wich make cycling on all sorts of terrain possible. Of course, such bicycles are quite expensive with even the cheaper models costing in the vicinity of $100.00 Thus, along with the increase in cycling there has been a marked increase in the theft of bicycles. In former times, a bicycle thief would generally only be interested in stealing a whole bicycle. Thus, any form of protective device which prevented the bicycle from being ridden or carried away was generally sufficient to protect the owner's property. However, bicycle thieves have become more sophisticated. Since most of the expensive parts of the bicycles are included in the frame and the rear wheel assembly, such thieves are satisfied to steal those portions and leave the front wheel, which may be attached to a rack or the like, in place. Front wheels are relatively inexpensive and may easily be removed and replaced. Thus all the thief must do in such a case is to replace the front wheel and he immediately has a saleable item. Thus, bicycle racks which protect the bicycle by locking only the front wheel are no longer acceptable to provide the type of protection needed by a bicycle owner. This means there is a need for a type of bicycle locking rack which will effectively prevent a thief from stealing any portion of the bicycle and in particular the frame and rear wheel assembly.

Over the years various attempts have been made to provide adequate locking bicycle racks. Typical is the rack disclosed in U.S. Pat. No. 614,432 granted to D. B. Austin on Nov. 22, 1898. The disclosed rack locks the front wheel of the bicycle in place. Obviously, all this protects is the front wheel itself and a thief can remove the remainder of the bicycle by loosening the nuts. Thus an arrangement such as this is not effective. Another type of bicycle stall is disclosed in German Patent No. 97861 granted to Martin Hirshlaff on Sept. 5, 1897. Again, only a small lock and chain hold the bicycle in place. Aside from the fact that the chain might easily be cut, the major portions of the bicycle can still be removed and taken. For example, the rear wheel is easily accessible and could be removed from a rack of such nature.

SUMMARY OF THE INVENTION

The locking bicycle rack of the present invention avoids the problems in the prior art locking devices. To do this it provides two side walls affixed to the ground i.e. affixed to cement or blacktop, wood or the like, between which the bicycle is placed, along with a locking bar which is lowered against the frame of the bicycle to hold it firmly to the ground. The side walls limit the space available for a thief to get at the wheel nuts and other portions of the bicycle. Furthermore, since the bicycle is held firmly against the ground it is impossible to remove the wheels. In the preferred embodiment a coin operated mechanism such as those installed in terminal lockers is used along with a removable key. The cyclist places his bicycle between the two walls, adjusts the locking bar to hold his bicycle in place, inserts a coin to activate the lock which he may thereupon turn to the locked position and removes the key. Because the bicycle is between the two walls and held essentially against the ground by the locking bar, it is impossible for a thief to remove either wheels or frame. Thus, the major portion of the bicycle is protected in a fashion which is much more secure than devices of the prior art.

A first embodiment is illustrated in which a plurality of adjacent stalls are provided. This embodiment, although it performs the desired function, is expensive to manufacture.

A second and preferred embodiment is one in which the side walls along with a base member are formed by bending galvanized sheet steel into a U-shape. The bottom of the U-shape member is then provided with suitable holes for bolting it to cement, blacktop or the like. In this embodiment the side walls are made only high enough to prevent access to the wheels. A further feature of this embodiment comprises a hump attached to the base portion of the U-shaped member in the middle. Once the locking bar is lowered against the frame this prevents any possibility of a thief pulling the bicycle out from between the walls far enough to get at the rear wheels. Furthermore in this embodiment a locking bar which is adapted to lock either a girl's or a boy's bicycle is illustrated. The locking bar has on its end a channel member having an horizontal portion for engaging the horizontal bar on a boy's bicycle and an angled portion for engaging the angle on a girl's bicycle.

BRIEF DESCRIPTION OF THE DRAWINGS

FIG. 5 is a perspective view of a second and preferred embodiment of the present invention.

FIG. 6 is an exploded view illustrating the construction of the locking bar and locking mechanism of the embodiment of FIG. 5.

DETAILED DESCRIPTION OF THE PREFERRED EMBODIMENT

Figure 1:
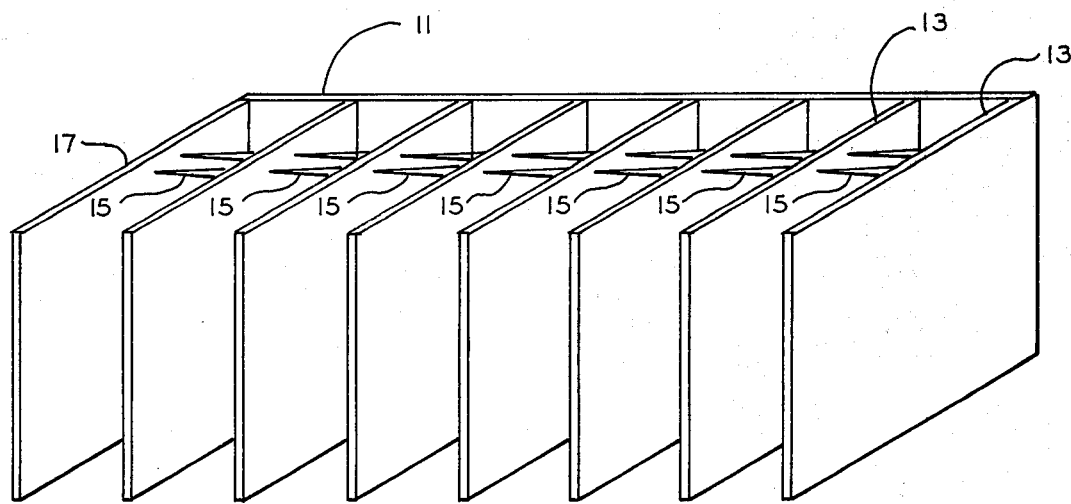
FIG. 1 is a perspective view of a multi-position locking rack constructed according to the present invention.

FIG. 1 illustrates a multi-stall locking rack installation. In the illustrated embodiment, six stalls are shown. However, it will be recognized that as few as one stall and as many more than six stalls as are required may be used. The stall includes a back wall 11 which runs across the whole length of the installation. A plurality of side walls 13 are installed perpendicular to the back wall at a fixed spacing. Each of the side walls 13 has installed in it a set of locking bars 15 to be described in more detail below in connection with FIG. 2. The end partition or side wall 17 is a plain wall without locking bars since no bicycles will be on the other side of the wall. The walls 11, 13 and 17 may be bolted to a slab of concrete or the like or alternately may be set into the concrete prior to hardening. Other forms of attachment such as the use of epoxies and so on are also possible. It is only necessary that the walls be securely attached to a base (which in some cases could be a wooden base rather than concrete or the like) so that they cannot be easily removed.

Figure 2:
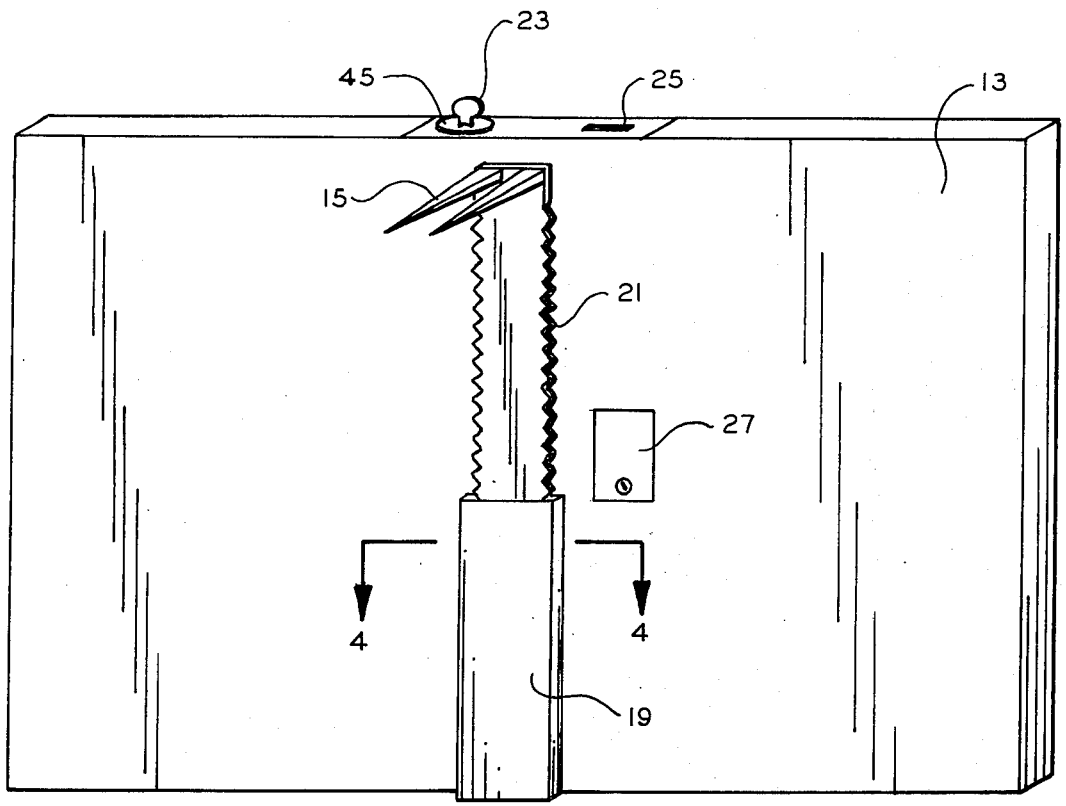
FIG. 2 is a side view of one of the partitions of FIG. 1 showing the locking mechanism.

A side view of one of the walls or partitions 13 is shown on FIG. 2. Attached to the wall 13 is a column track 19 in which an adjustable column 21 with a plurality of detents and having the locking bars 15 attached thereto may be removed. With the lock open, pins within the column track are released to permit adjusting the column 21. The column 21 with the locking bars 15 will initially be moved all the way upward to the position shown to permit pushing the bicycle in underneath the bars 15. The column and locking bars will then be lowered until the bars contact the frame of the bicycle to hold it firmly down against the ground. At this point, a key 23 may be turned to cause the locking pins to be inserted into the detents to prevent the column 21 from moving. The locking mechanism which holds the column in place may be of any of a number of well known types of mechanisms.

Figure 4:
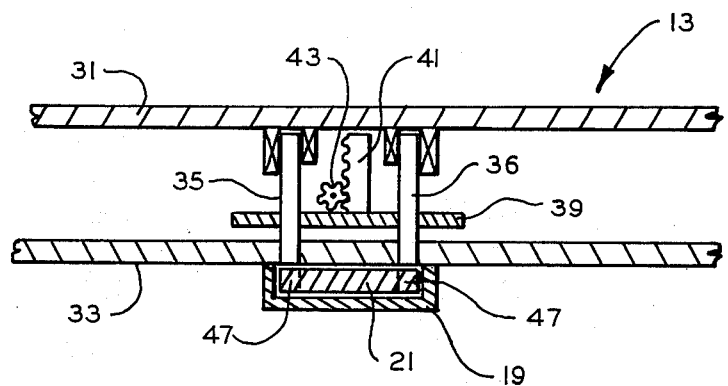
FIG. 4 is a cross sectional plan view illustrating a possible locking mechanism for use in the rack of FIG. 1.

An example of a possible embodiment is illustrated on FIG. 4. Here a cross section is taken along the line IV — IV of FIG. 2. The wall 13 will be hollow at least in the center portion with a space between the two sides 31 and 33. A pair of pins 35 and 36 are supported for in and out motion in holes in wall 33 and bearings 38 attached to wall 31. The pins are fastened to a bar 39 having a rack gear 41 mounted thereto. Rack gear 41 is engaged by pinion 43 which is directly coupld to the tumbler of the lock 45 of FIG. 2 into which key 23 is inserted. In the position shown, column 21 is free to move up and down in track 19. However, if the key is rotated clockwise rotating pinion 43, the pins 35 and 36 will be inserted in detents 47 indicated by dotted lines on FIG. 4. Removal of the key prevents release of pins 35 and 36 thus preventing the raising of column 21 and removal of a bicycle secured in place. This locking mechanism is only illustrative. Many others exist in the art and may equally well be used.

Figure 3:
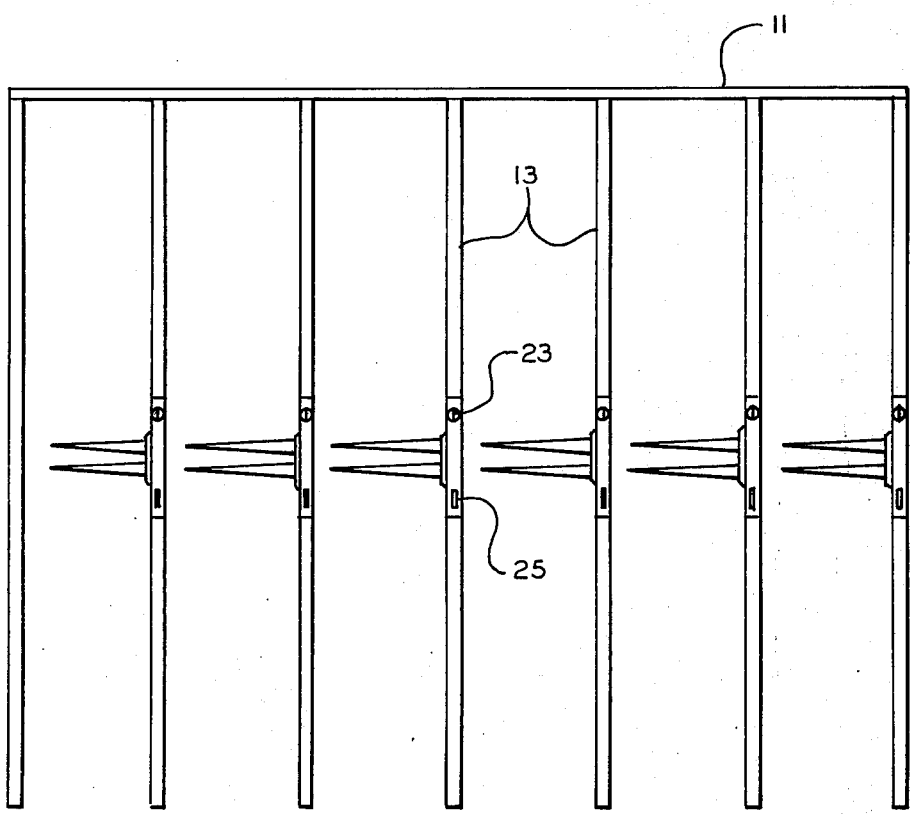
FIG. 3 is a plan view of the embodiment of FIG. 1.

Also shown on the embodiment of the figures and most clearly on FIG. 3 is a coin slot 25. A multiple stall installation such as shown wil generally be installed at a public place and it generally be desired to charge a fee for parking within the stalls. Thus, a coin slot which operates the key 23 in the same manner as the types of lockers found in railroad terminals, airline terminals, and the like may be installed. Also shown is a lock coin box 27 into which the coins from coin slot 25 will drop when the key is operated to lock the rack, so that the owner may later remove the proceeds.

Although the embodiment just described works quite well it is expensive to construct. FIGS. 5 and 6 illustrate an embodiment offering the advantages of the embodiment of FIGS. 1–4 but which is of a simpler construction. As illustrated on FIG. 5, the side walls 13 in this embodiment are a portion of a U-shaped member designated generally as 51. The U-shaped member 51 can be made from a sheet of galvanized steel and which is bent so as to form the two sidewalls 13 and a base portion 53. The base 53 is provided with holes 55 through which bolts 57 may be inserted to bolt the rack to a concrete base or the like. Alternatively it may be set in concrete or epoxied in place. Although galvanized steel is given as an example of a material, other materials having equal strength and equal resistance to the elements may be used. Furthermore, the members i.e. the sides 13 and base 53, may be separate pieces which are attached to each other using any conventional means rather than a single piece of material which is bent. The sides 13 need only be of a height and length adequate to cover the axles on a bicycle. Typical dimensions of a side wall are four feet long by one and a half feet high. The width of the base member 53 will typically be one foot. Galvanized sheet steal of approximately 16 gauge will have adequate strength for the rack of FIG. 5. Attached to one side 13 of the rack is a member 57 forming a channel into which the locking bar may be inserted. This channel shaped member 57 may also be of galvanized sheet steel bent in the shape shown and riveted or spot welded to the side 13. Inserted into the channel is an L-shaped locking bar 59 having on its end an angled channel member 61 for engaging the frame of the bicycle. The members 61 contain an horizontal portion 63 and an angled portion 65. The horizontal portion 63 is adapted to engage the horizontal bar on a boy's bicycle and the angled portion 65 to engage the angled bar on a girl's bicycle. Members 59 and 61 will preferably be made from bar stock although other equivalent materials may be used.

FIG. 6 is an exploded view illustrating the locking arrangement in more detail. The L-shaped locking bar 59 is provided with a plurality of holes 67 along the length of its vertical member 69. On the outside of the side wall 13 a conventional coin operated lock 71 is attached by riveting or the like. Coin operated locks of this nature can be obtained from the American Locker Co., Chicago, Ill. Coin operated lock 71 is shown as having a key 73 and a coin slot 75. A lock bolt 77 extends therefrom through a hole 79 in the side wall 13 to engage one of the holes 67 in the vertical bar 69 to lock the locking bar 59 in place against the frame of the bicycle. Also shown on this Figure is the channel member 57 having a plurality of holes 79 therein which mate with holes 81 in the side wall 13 to permit rivets 83 to be used to attach these two portions together.

This Figure also illustrates the construction of the member 61, made up of the horizontal portion 63 and the angled portion 65, which engages the frame of the bicycle. Clearly illustrated is the channel 85 which slips over the frame of the bicycle. Also shown is a spring 84 placed in the base of the channel against which the bottom of member 69 will rest when all the way down. This spring is used to cushion the locking bar 59 if it is dropped from a raised position.

Returning to FIG. 5, a further feature of the invention is illustrated. Shown is a hump shaped portion 91 installed in the middle of the inside of the U-shaped bicycle rack. This hump portion, which is also illustrated in the exploded view of FIG. 6 contains a cutout 93 to fit around the channel bracket 57 and may be riveted or spot welded to the base 53 of the U-shaped rack. Its purpose is to prevent any possibility of a thief dragging a bicycle against the force of the channel bracket 61 to a position where he can get at one of the wheels. Although such would have to be done at the expense of severely scraping the paint where the frame contacts the member 61, such might in some cases be possible. Thus, the hump 91 is provided which, once the locking bar 59 is in place, cooperates therewith to prevent any movement of the bicycle.

Once locked in place, the bicycle cannot be removed nor is it possible for a thief to remove the wheels from the bicycle. Because of the manner in which the bicycle is held in place, there is not sufficient clearance to get at the wheels and get them off the frame. Thus, the major portions of the bicycle are effectively protected. In practice, the only parts which can easily be removed are the seat and handle bars.

Thus, an improved bicycle locking device has been shown. Although specific embodiments have been illustrated and described, it will be obvious to those skilled in the art that various modifications may be made without departing from the spirit of the invention which is intended to be limited solely by the appended claims.

What is claimed is:

1. A locking bicycle rack comprising:
    a. a U-shaped member having first and second parallel side walls and a bottom portion, said first and second parallel side walls being of a length greater than the nominal spacing between the axles on the largest bicycle to be protected by the bicycle rack and of a height greater than the height of said axles from the ground;
    b. means for securing said bottom portion of said U-shaped member to a solid base, thereby securing said side walls to permit a bicycle to be placed therebetween;
    c. a vertically adjustable locking bar comprising an L-shaped member having a vertical portion, said vertical portion being held against one of said side walls by a channel-shaped member attached to said side wall, and a horizontal portion extending to a position over the mid-point between said side walls, said horizontal portion having means thereon for engaging the frame of a bicycle comprising a channel-shaped member having a horizontal portion and an angled portion, the former adapted to engage the horizontal bar on a boy's bicycle and the latter to engage the angled bar on a girl's bicycle; and
    d. means to lock said locking bar in place, whereby said locking bar may be moved up to permit placing a bicycle between said walls and then lowered against the bicycle frame to prevent it or portions thereof from being stolen.

2. The invention according to claim 1 wherein said bottom portion is provided with a plurality of holes through which bolts may be inserted to bolt said bottom and said side walls to a solid base.

3. The invention according to claim 1 wherein said U-shaped member comprising said side walls and said bottom portion is made of a sheet of material bent to form said U-shape.

4. The invention according to claim 3 wherein said material is galvanized steel.

5. Apparatus according to claim 1 wherein said means for locking comprise a coin operated lock having a bolt, said lock being attached to the side of said side walls opposite said locking bar, said side wall having a hole formed therein through which said bolt extends, and the vertical portion of said locking bar containing a plurality of holes which said bolt can engage.

6. The invention according to claim 1 and further including a hump shaped member located in the middle of said bicycle rack between said sidewalls and secured to said bottom portion whereby, after clamping in place, said bicycle will be held securely and prevented from being dragged forward or backward.

7. A locking bicycle rack comprising:
    a. a U-shaped member having first and second parallel side walls and a bottom portion, said first and second parallel side walls being of a length greater than the nominal spacing between the axles on the largest bicycle to be protected by the bicycle rack and of a height greater than the height of said axles from the ground;
    b. means for securing said bottom portion of said U-shaped member to a solid base, thereby securing said side walls to permit a bicycle to be placed therebetween;
    c. a vertically adjustable locking bar comprising an L-shaped member having a vertical portion, said vertical portion being held against one of said side walls by a channel-shaped member attached to said side wall, and a horizontal portion extending to a position over the mid-point between said side walls, said horizontal portion having means thereon for engaging the frame of a bicycle; and
    d. means to lock said locking bar in place comprising a coin-operated lock having a bolt, said lock being attached to the side of said side wall opposite said locking bar, said side wall having a hole formed therein through which the bolt extends, and the vertical portion of said locking bar containing a plurality of holes which said bolt can engage, whereby said locking bar may be moved up to permit placing of bicycle between said walls and then lowered against the bicycle frame to prevent it or portions thereof from being stolen.

8. The invention according to claim 7 wherein said means for engaging said bicycle frame comprises a channel shaped member having a horizontal portion and an angled portion, the formed adapted to engage the horizontal bar on a boy's bicycle and the latter to engage the angle bar on a girl's bicycle.

9. The invention according to claim 7 wherein said bottom portion is provided with a plurality of holes through which bolts may be inserted to bolt said bottom and said side walls to a solid base.

10. The invention according to claim 7 wherein said U-shaped member comprising said side walls and said bottom portion is made of a sheet of material bent to form said U-shape.

11. The invention according to claim 10 wherein said material is galvanized steel.

12. The invention according to claim 7 and further including a hump-shaped member located in the middle of said bicycle rack between said side walls and secured to said bottom portion whereby, after clamping in place, said bicycle will be held securely and prevented from being dragged forward or backward.

* * * * *